US009855666B2

(12) United States Patent
Lopez et al.

(10) Patent No.: US 9,855,666 B2
(45) Date of Patent: Jan. 2, 2018

(54) APPARATUS FOR CUTTING TWISTED STRIPS

(71) Applicant: The Last Twist, Inc., Conshohocken, PA (US)

(72) Inventors: Jorge Antonio Alcala Lopez, Guadalajara (MX); Ernest O. Evans, Conshohocken, PA (US)

(73) Assignee: THE LAST TWIST, INC., Conshohocken, PA (US)

( * ) Notice: Subject to any disclaimer, the term of this patent is extended or adjusted under 35 U.S.C. 154(b) by 699 days.

(21) Appl. No.: 13/889,908

(22) Filed: May 8, 2013

(65) Prior Publication Data

US 2014/0030036 A1    Jan. 30, 2014

(30) Foreign Application Priority Data

May 9, 2012   (MX) .................. MX/A/2012/005395

(51) Int. Cl.

| | |
|---|---|
| *B26D 3/26* | (2006.01) |
| *B26D 3/11* | (2006.01) |
| B26D 3/16 | (2006.01) |
| B26D 3/22 | (2006.01) |
| B26D 3/20 | (2006.01) |
| B26D 1/00 | (2006.01) |
| B23B 39/16 | (2006.01) |
| B26D 3/18 | (2006.01) |

(Continued)

(52) U.S. Cl.
CPC .............. *B26D 3/11* (2013.01); *B23B 39/161* (2013.01); *B23B 51/044* (2013.01); *B23B 51/0406* (2013.01); *B26D 3/001* (2013.01); *B26D 3/167* (2013.01); *B26D 3/185* (2013.01); *B26D 3/20* (2013.01); *B26D 3/22* (2013.01); *B26D 3/26* (2013.01); *B26D 2001/006* (2013.01); *B26D 2001/0073* (2013.01); *Y10T 83/6588* (2015.04); *Y10T 408/38* (2015.01); *Y10T 408/385* (2015.01); *Y10T 408/895* (2015.01)

(58) Field of Classification Search
CPC .......... B26D 3/11; B26D 3/185; B26D 3/167; B26D 3/001; B26D 3/26; B26D 2001/006; B26D 2001/0073; B26D 3/20; B26D 3/22; Y10T 408/38; Y10T 408/895; Y10T 408/385; Y10T 83/6588; B23B 39/161; B23B 59/0406; B23B 51/044
See application file for complete search history.

(56) References Cited

U.S. PATENT DOCUMENTS

| 513,088 | A | * | 1/1894 | Crane | ............................. 408/53 |
| 2,561,185 | A | * | 7/1951 | Drake | ........................... 408/204 |
| 2,879,675 | A | * | 3/1959 | Morris | ..................... 74/665 GA |

(Continued)

*Primary Examiner* — Sunil K Singh
*Assistant Examiner* — Paul M Janeski
(74) *Attorney, Agent, or Firm* — Birch, Stewart, Kolasch & Birch, LLP

(57) ABSTRACT

A mechanical cutting device cuts twisted strips of foods such as potatoes. The device comprises twisted cutting tubes, each having a ring secured at a distance from the cutting end. A plurality of such tubes may be arranged in an array, which may be supported by plates having an array of tube-supporting orifices. The cutting tubes are supported for rotation in such manner that, when force is exerted on the tubes to insert the tubes into the food, the tubes rotate as they cut into the food obtaining as result twisted strips of food.

21 Claims, 4 Drawing Sheets

(51) Int. Cl.
    *B26D 3/00*     (2006.01)
    *B23B 51/04*     (2006.01)

(56) References Cited

U.S. PATENT DOCUMENTS

| | | | | |
|---|---|---|---|---|
| 3,687,688 | A | * | 8/1972 | Stapley ............ 426/302 |
| 4,871,287 | A | * | 10/1989 | Hougen ............ 408/204 |
| 5,085,543 | A | * | 2/1992 | Click ............ 408/48 |
| 5,186,967 | A | * | 2/1993 | Housley ............ 426/438 |
| 5,281,060 | A | * | 1/1994 | Strange et al. ............ 408/204 |
| 6,123,490 | A | * | 9/2000 | Underhill ............ 408/204 |
| D525,762 | S | | 8/2006 | Evans |

* cited by examiner

APPARATUS FOR CUTTING TWISTED STRIPS

BACKGROUND OF THE INVENTION

U.S. Design Patent D525,762 discloses a food item, commonly referred to as a French fry, in a novel twisted shape. Such a novel shape for a popular food item can have great appeal to consumers. The present invention provides a device capable of easily and efficiently producing food items in such a shape.

SUMMARY OF THE INVENTION

The present invention provides a mechanical cutting device to cut foods into twisted strips. The apparatus includes at least one, but generally a plurality of twisted stainless steel cutting tubes that have a cutting end and a rotatable mount at a distance from the cutting end. The tubes are appropriately supported and guided so that, when force is exerted to insert the cutting tubes into the food, the tubes are permitted to turn to thereby cut the food into twisted strips.

Exemplary embodiments disclosed herein comprise square cutting tubes for producing twisted square strips of food. The tubes can take on other configurations whereby the twisted strips will have other cross-sectional shapes.

In a preferred embodiment, the present invention comprises a plurality of knife blades in the form of square cutting tube that has a cutting end, a longitudinal axis, and a ring for providing a rotational mount at a distance from the cutting end. The rotational mount serves to permit rotation of the cutting tube (or "knife") as it is inserted into the food. The ring is enclosed in opposing circular concave cavities in adjacent faces of a pair of plates, thus allowing the knife to rotate. The plates also act as a platform or assembly to move the knife in the direction of its longitudinal axis to advance the knife, with a sufficient force to penetrate into and cut a food such as a potato (or any food product that may be cut similarly). The plate may then move in the reverse direction to withdraw the knife and the cut food in the form of a twisted square strip such as twisted French fries, as shown for example in U.S. Design Patent D525,762. Preferably, the apparatus contains an array of such knives to maximize the conversion of the food (potato) into twisted shapes (e.g. French fries).

The present invention has been found to be an effective and efficient device for cutting foods into twisted shapes without damage to the food, particularly for cutting a potato to produce twisted French fries.

While the present invention is described as useful for cutting foods into novel shapes, it is not limited to cutting foods, but might be useful for cutting any material that may be cut in the manner described herein.

BRIEF DESCRIPTION OF THE DRAWINGS

The nature of the invention will be best understood upon consideration of the following detailed description taken together with the accompanying drawings in which.

DETAILED DESCRIPTION OF A PREFERRED EMBODIMENT

Figure 1:
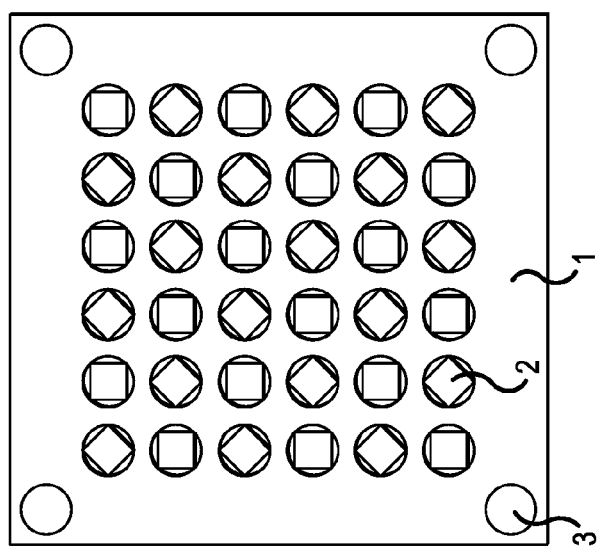
FIG. 1 is a front view of a plate guide in accordance with the invention.

Referring to FIG. 1, one component of the invention is a plate 1 which serves as a joint guide for the cutting tubes. The plate comprises a plurality of apertures 2 through which the respective cutting tubes pass. Apertures 3 serve as guides for mounting the plate to the apparatus and for guiding the plate for movement in the direction of the axis of the cutting tubes, as will be described in greater detail below. The plate 1 may be made of a plastic or metal. Stainless steel of sanitary grade is well suited when the device is used for cutting foods. The particular plate illustrated in FIG. 1 is configured for an apparatus that includes a 6×6 array of 36 cutting tubes.

Figure 2:
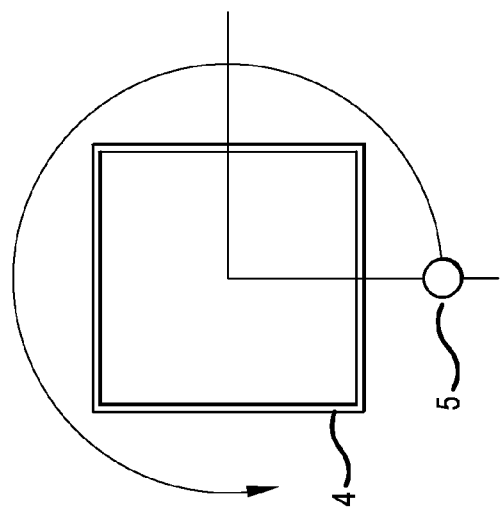
FIG. 2 is an end cross-sectional view of a cutting tube in accordance with the invention.

FIG. 2 is an end cross-sectional view of a cutting tube or knife 4 according to the invention illustrating the square cross section of a particular embodiment used for cutting strips of square cross section. As indicated by reference numeral 5, the tube is twisted about its longitudinal axis. The total rotation of the tube along its length from end to end can vary, preferably from 30 degrees up to 360 degrees.

Figure 3:
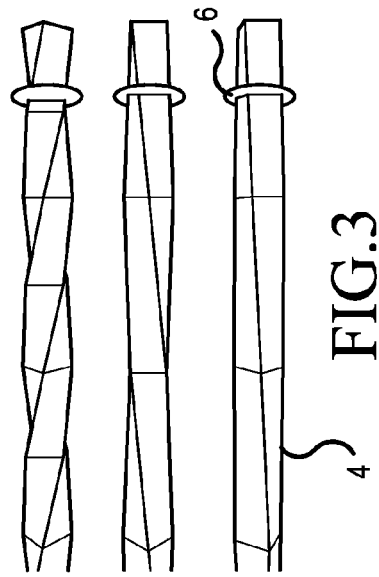
FIG. 3 is a side view of several cutting tubes of the invention showing different degrees of twisting of the tube.

As illustrated in FIG. 3, the cutting tubes may be subject to different degrees of rotation (twist) to cut and obtain twisted strips exhibiting different degrees of twist. Tubes 4 may be formed of any suitable material, such as stainless steel.

Figure 4:
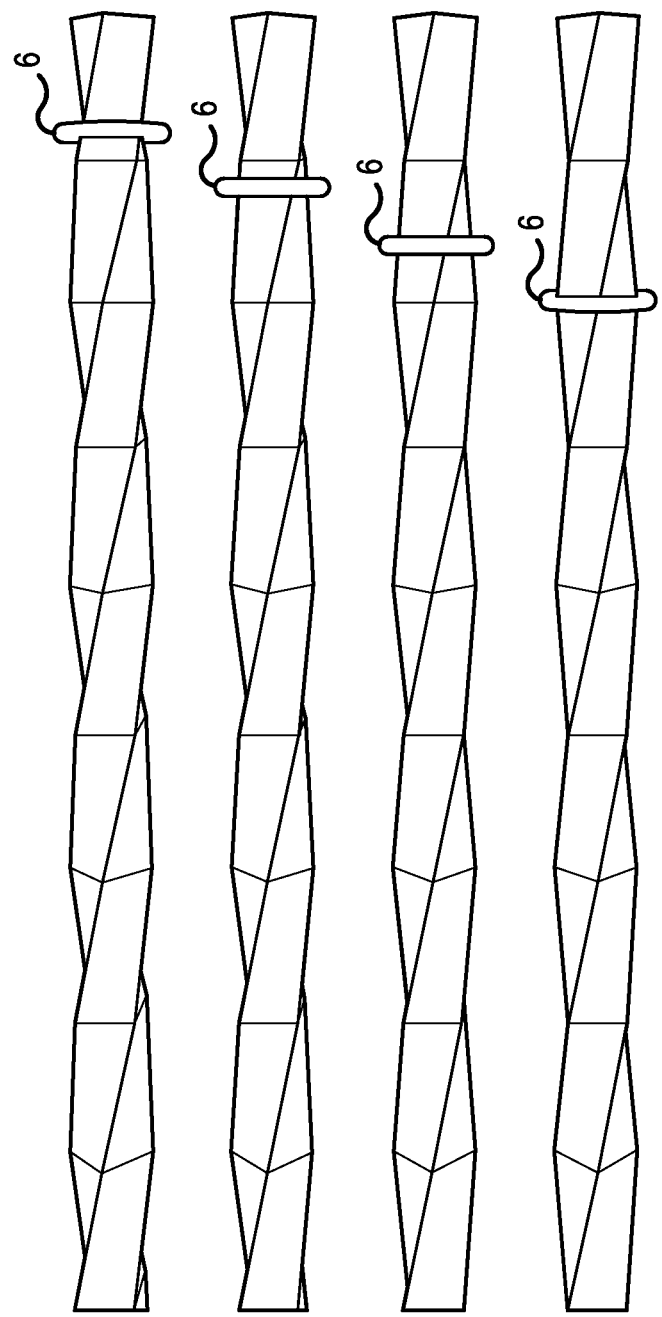
FIG. 4 is a side view of a plurality of cutting tubes with the rings in different positions along the tube.

The tubes 4 each have a cutting end, at the left end of the tubes as seen in FIG. 3. Each tube has a ring 6 secured to the outer part thereof at a position spaced from the cutting end, generally at the opposite end of the tube. The ring 6 may also be formed from stainless steel and is secured to the outer part of the tube 4 such as by welding. The rings are supported within aperture plates in a manner to permit rotation of the tubes, as described below. The rings on the respective tubes may be mounted at different distances from the cutting ends, as illustrated in FIG. 4. This permits mounting an array of axially aligned cutting tubes closer to one another, in a tighter-packed array, by mounting the rings of adjacent tubes offset axially from one another. Arranging the cutting tubes in a closer-packed array has the advantage of cutting more of the total food material into useful product with less waste.

Figure 5:
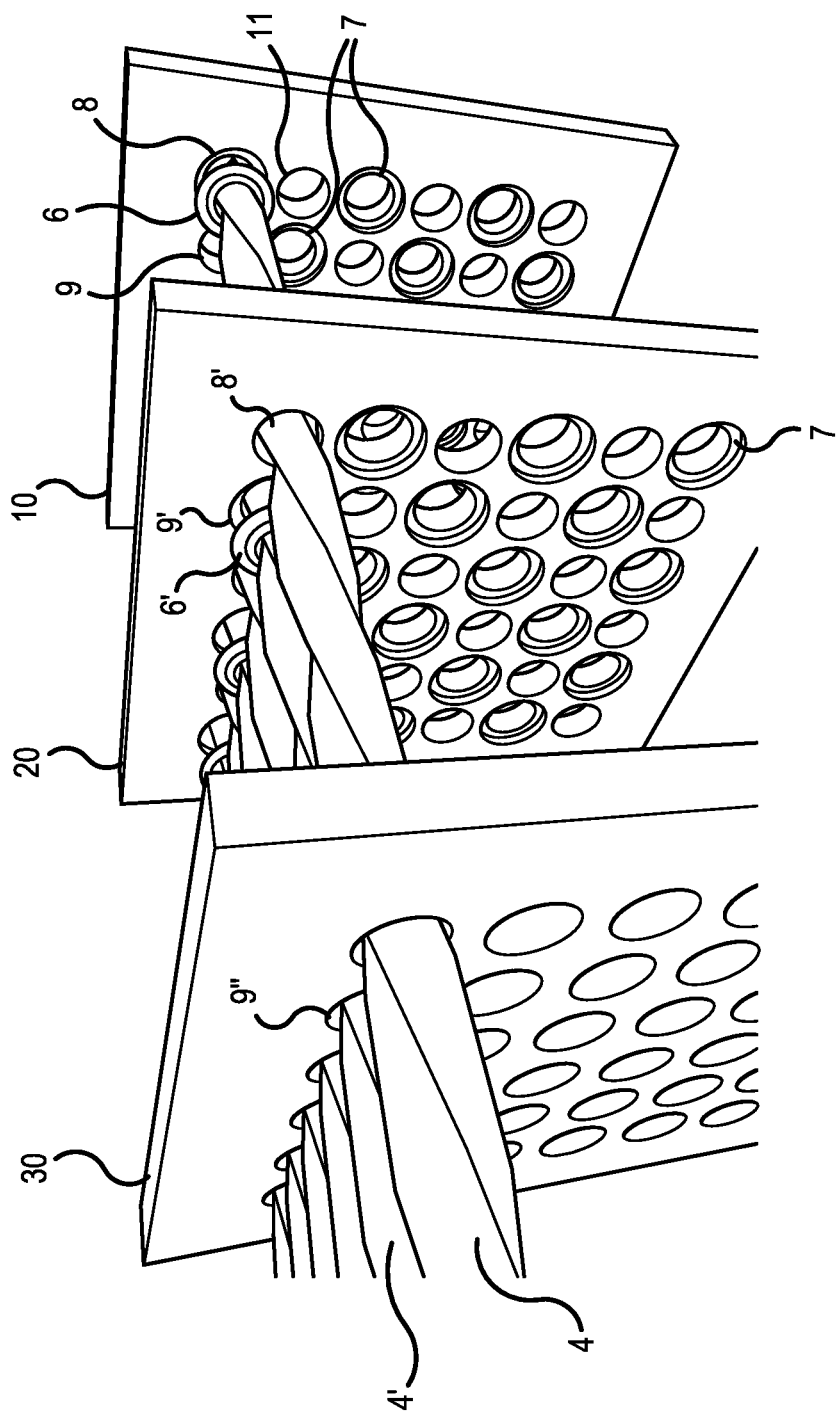
FIG. 5 is a perspective view of an exemplary system of plates, in accordance with the invention, that support the tubes and secure the rings of the tubes in the plate cavities.

FIG. 5 illustrates the manner in which cutting tubes 4 are supported in an array in accordance with the invention.

As shown in FIG. 5, an apparatus in accordance with the invention will comprise an array of cutting tubes supported in plates having an array of apertures. The embodiment of FIG. 5 is suitable for an array of 36 tubes in six rows of six tubes each. Tubes are shown only in the top row of the array for clarity.

A first plate 10 is provided with an array of apertures. At least some of the apertures include an annular groove 7 around their periphery at the surface that faces an additional plate 20.

Additional plate 20 is provided having a similar set of apertures. The apertures in plate 20 aligned with those in plate 10 that have an annular groove have a like annular groove 7 thereabout at the surface of plate 20 that faces plate 10 (not visible in the figure). Thus, when plates 10 and 20 are brought into abutment, the facing grooves 7 form an annular recess within the aperture passing through plates 10 and 20.

As seen in FIG. 5, cutting tube 4 extends through the upper-right corner aperture 8 in plates 10 and 20. That aperture in plate 10 has annular groove 7 extending thereabout at the face of plate 10 visible in the illustration. The aligned hole 8' in plate 20 has a similar groove thereabout at the face of plate 20 facing plate 10. When the plates 10 and 20 are brought together, the tube 4 passes through the aligned apertures of plates 10 and 20. Plates 10 and 20 are secured to each other by, i.e., bolts or other suitable fasteners. The ring 6 associated with tube 4 is enclosed within the combined groove formed within the combined plates by the facing annular grooves 7. The dimension of the grooves 7 are such that the ring 6 is captured within the annular recess formed by the adjacent grooves. As a result, the tube 4 cannot move with respect to plates 10 and 20 in a direction along the axis of the tube. However, the dimension of the grooves and the rings are chosen such that the rings 6, while held between the plates so as to prevent axial movement of the tubes 4, are held loosely enough to permit the tubes and the rings to rotate within the apertures and the grooves. This arrangement permits tube 4 to rotate within the aperture in plates 10 and 20. As described below, this will permit tube 4 to rotate as tube 4 is inserted into the food that is to be cut into twisted strips.

It is possible for all of the tubes of the array to be mounted as described above with their respective rings 6 held between plates 10 and 20. In that arrangement only the two plates would be needed to support all of the cutting tubes for rotation. However, it can be advantageous to provide another mounting arrangement involving additional mounting plates.

As illustrated in FIG. 5, the mounting arrangement can comprise, for example, three plates 10 and 20, as described above, and a third similar plate 30. Plates 10 and 20 have an array of aligned apertures, as noted above. In accordance with this aspect of the invention, every alternate hole in plate 10 comprises an annular groove at the face of plate 10 that faces plate 20. Plate 20 has such annular grooves associated with the corresponding apertures at the face of plate 20 that faces plate 10, thus forming the mounting arrangement for tubes 4 as described above.

At the alternate holes in plate 10, as shown by reference numeral 9, there is no annular groove in plate 10. Rather, there is an annular groove in plate 20 at the corresponding aperture 9' on the face of plate 20 that faces third plate 30. Plate 30 has an array of apertures like plates 10 and 20. The aperture 9" in plate 30 corresponds with the aperture 9' in plate 20 and has an annular groove thereabout at the face of plate 30 that faces plate 20. When plates 20 and 30 are brought into abutment, the facing grooves in the aligned holes 9' and 9" enclose ring 6' associated with tube 4'. This mounts tube 4' between plates 20 and 30 for rotation in the same manner that tube 4 is mounted between plates 10 and 20 for rotation. The rings 6 and 6' on tubes 4 and 4' can be positioned at different points along the length of tubes 4 and 4', respectively, as illustrated in FIG. 4, to accommodate the different axial position at which the respective tubes are secured between the different plates.

Thus, each plate 10 and 30 will have circular grooves surrounding alternate apertures on only one of its faces. Plate 20 will have grooves surrounding alternate apertures in one face corresponding to the grooved apertures in plate 10 and grooves surrounding the remaining apertures at the face corresponding to the grooved apertures in plate 30. The three plates, when assembled into a unit, will support all of the tubes in the array in a more close-packed arrangement than would be possible if all tubes were secured between only two plates, such as 10 and 20. This is because the aperture plus the groove around the aperture, such as illustrated at 8 on plate 10, is of a larger total diameter than an aperture alone, such as shown at 11 in FIG. 5. By placing those larger diameter arrangements of aperture and groove in different planes on alternate faces of the supporting plates it is possible to bring the tubes into closer proximity with each other. This results in a more densely packed array of tubes. The result is that the apparatus can more economically cut a food into twisted strips with less waste material.

An apparatus 40 according to the invention will be described with reference to FIG. 6. Apparatus 40 includes a base member 42 that includes rails 44 extending along each side (only one rail 42 being identified in the figure). At one end is mounted a backing member 44. Adjacent backing member 44 there are included, in this embodiment, angled support members 46 and 48. Members 46 and 48 along with backing member 44 define a space in which a food, such as a potato, can be placed for cutting by the apparatus. Portions 42-48 of the apparatus will typically be made of a strong, hard material such as steel or other metal. A protective member 50 may be provided. Protective member 50 may be made of a softer material in order to protect the cutting ends of tubes 4 against damage by abrasion against the surface of backing member 44, and may also provide a surface for stabilizing the food placed in the apparatus.

Figure 6:
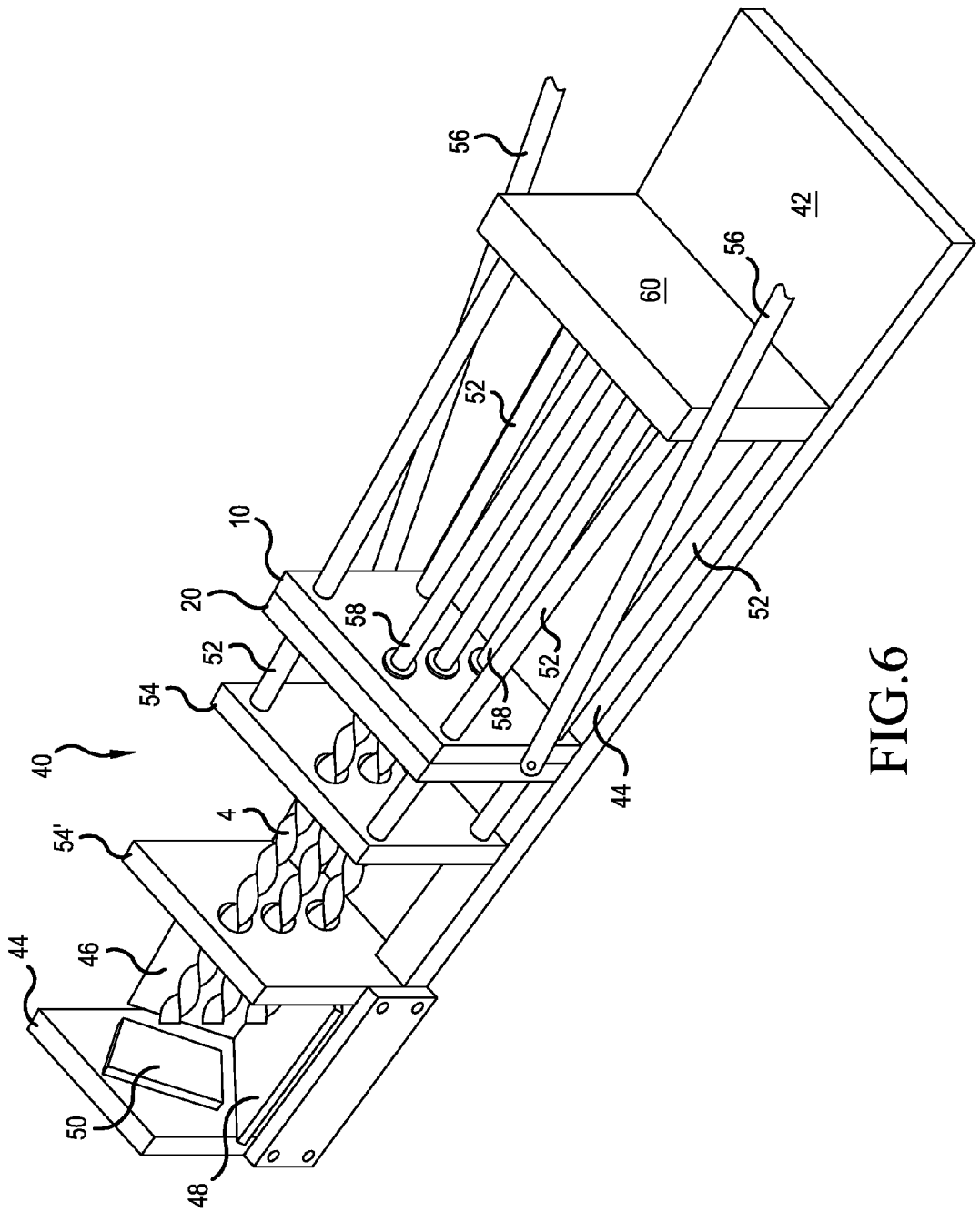
FIG. 6 is a perspective view of an exemplary cutting apparatus in accordance with the invention.

The exemplary embodiment of FIG. 6 includes simply a pair of plates 10 and 20 mounting the entire array of cutting tubes 4, each in a rotatable manner as described above. (The apparatus could comprise three or more plates mounting the array of tubes in order to achieve a more closely packed array, as described above.) The array of tubes could comprise any number of tubes. Only three tubes are illustrated for clarity.

Plates 10, 20 are movable along the length of the apparatus along rails 42 and are also guided by rods 52 that pass through openings 3 in the respective plates. The array of cutting tubes 4 extends through guides 54, 54' which serve to retain the array of tubes in proper alignment.

Arms 56 are attached to the combined plates 10, 20. Arms 56 may be driven by manual means, a hydraulic or pneumatic device, or by any suitable means associated therewith (not illustrated) for driving plates 10, 20, and thus the array of cutting tubes 4, into a food placed in the space defined by supports 46, 48 and backing member 44.

As the plates and cutting tubes are driven into the food, the twisted shape of the tubes imparts a rotating motion to each tube. The tubes may be twisted in the same direction, whereby they will all rotate in the same direction in the cutting operation. Alternatively, the tubes may be twisted in opposite directions whereby they will rotate in opposite directions during the cutting operation. In either event, as the tubes rotate as they are driven into the food, each tube will cut a twisted strip from the food. If the tube is square in cross-section, the cut food will resemble a twisted French fry as shown in design Patent D525,762.

Once the cutting tubes are advanced through the food, the drive arms 56 are reversed to withdraw the plates 10, 20 and the tubes 4 from the food. The tubes will withdraw the cut twisted strip from the food as they are withdrawn and rotate in a reverse direction.

Ejection rods 58 are provided, one for each cutting tube. Ejection rods 58 are supported on member 60 of the apparatus with one rod 58 extending into each of the respective hollow cutting tubes through plates 10, 20. Ejection rods 58 are of sufficient length to extend to the position of guide 54. As a result, when the plates and cutting tubes are withdrawn from the food after cutting the twisted strips, the rods 58 push the cut strips out of the tubes as the tubes are withdrawn. As the cutting tip of the tubes 4 travel, during the withdrawal stroke, from the position of guide 54' to the position of guide 54, the ejection rods 58 push the cut strips out of the tubes and they will fall into the space between guides 54 and 54'. A suitable collection device can be provided to catch the cut strips.

A device according to the invention can comprise as little a one cutting tube to cut a single strip at a time, or a great number of cutting tubes in the array to cut many strips from many input food items. The dimension of the tubes can be varied to create cut strips of desired dimensions. The cross-sectional shape of the tubes can also be varied to create strips of different configurations.

The invention has been described with reference to cutting foods into desired shapes. It is not limited to foods, but can be sued for any material that can be cut in similar fashion.

The cutting tubes of the device are preferably twisted stainless steel tubes with a cutting edge at one end with the ring welded at or near the other end. Other material may be used for the tubes. The remaining structural components of the apparatus, as seen in FIG. 6, for example, are to be made of material that is sufficiently strong and rigid. Parts that are brought into contact with foods should be made of materials suitable for such use.

In an exemplary device, the cutting tubes 4 may measure 10 mm×10 mm in cross section, have a length of 20 cm, with a total twist of 360 degrees over that length. The ring 6 may be formed of a material with a radius of about 2.5 mm (5.0 mm diameter), and is of a diameter to fit about the exterior of tube 4 to be secured thereto, as illustrated. The plates 10, 20 and/or 30 might have a thickness of about 6 mm and measure 17.5 cm×17.5 cm or any size to accommodate a desired array of cutting tubes. With the above dimensions for the tubes, the apertures in the plates may be about 16 mm in diameter with concave circular grooves 7 of about 3 mm in depth, whereby a pair of such grooves would total 6 mm to accommodate a ring 6 of 5 mm for rotational movement.

While there is no limit to the dimensions of a machine in accordance with the invention, it is envisioned that cutting tubes would generally measure from 5 mm×5 mm to 30 mm×30 mm in cross section (e.g., a non-circular cross sectional area of from about 25 $mm^2$ to 900 $mm^2$) and have a length of about 10 cm to 80 cm. The total rotation or twist of the tube can vary from 30 degrees up to 360 degrees according to the length of the tube. The diameter of the rings and the associated grooves for retaining the rings can vary according to the force that is required to drive the cutters into the food or other material to be cut to obtain the product that is needed. The total length of the cutting tube and the placement of the ring are determined by the length of stroke needed to penetrate and cut the food or other material to be processed by the apparatus. The circular apertures in a particular apparatus according to the invention are of a dimension proportional to the size of the cutting tube that is chosen and the concave circular grooves likewise are to have dimensions corresponding to the dimensions of the stainless steel ring(s) that are encapsulated between the plates.

We claim:

1. An apparatus for cutting material into twisted strips, comprising
   a hollow cutting tube having a non-circular cross-section and a twist about its longitudinal axis;
   said cutting tube being supported for movement in the direction of the tube axis into the material to be cut; and
   said cutting tube being supported to permit free rotation thereof in a first direction as the tube is inserted into the material to be cut;
   said cutting tube being supported to permit free rotation thereof in a second, opposite direction as the tube is withdrawn from the material to withdraw a twisted strip of the material conforming to the cross-section of the tube.

2. An apparatus as in claim 1, comprising
   a mounting element associated with said cutting tube;
   a support receiving said mounting element for supporting the tube;
   wherein said support is moveable in a direction to move the cutting tube along the tube axis into the material to be cut and to withdraw the tube from the material.

3. An apparatus as in claim 2, comprising a plurality of cutting tubes arranged on said support.

4. An apparatus as in claim 2, said mounting element comprising an annular projection attached to the exterior of the cutting tube, said support comprising a support member receiving and supporting said annular projection to permit rotation of the cutting tube.

5. An apparatus as in claim 4, said support member comprising an annular recess for receiving the annular projection of the cutting tube.

6. An apparatus as in claim 5, said support member comprising a first plate and a second plate, each of the first and second plates comprising an annular groove at a surface thereof, said annular grooves forming said annular recess for receiving the annular projection of said cutting tube when said first and second plates are joined to form said support member.

7. An apparatus as in claim 5, comprising
   at least a second cutting tube;
   said support member comprising a first plate, a second plate, and a third plate;
   each of the first and second plates comprising an annular groove at a surface thereof, said annular grooves of the first and second plates forming an annular recess for receiving the annular projection of one of said cutting tubes;
   said third plate having an annular groove at a surface thereof;
   said annular groove of said third plate cooperating with an annular groove of the second plate forming an annular recess for supporting said second tube;
   said first tube being supported by said first and second plates and said second tube being supported by said second and third plates when said first, second and third plates are joined to form said support member.

8. An apparatus as in claim 4, wherein said annular projection is a ring attached to the exterior of the cutting tube.

9. An apparatus as in claim 2, further comprising an element attached to the support for moving the support and the cutting tube in directions for inserting the cutting tube into the material to be cut and for withdrawing the cutting tube from the material.

10. An apparatus as in claim 1, comprising a plurality of cutting tubes for simultaneously cutting material into a plurality of twisted strips.

11. An apparatus as in claim 10, said plurality of tubes being arranged in an array.

12. An apparatus as in claim 1, said cutting tube having a square cross sectional shape.

13. The apparatus of claim 1, wherein said tube is freely rotatably mounted and rotates in said first direction in response to said tube being inserted into the material to be cut and in said second direction in response to said tube being withdrawn from the material.

14. Apparatus for cutting a food product into strips having a twisted shape comprising:
- a hollow cutting tube having a longitudinal axis, and a non-circular cross section;
- a first end of said tube comprising a food cutting element;
- said tube having a twist about its longitudinal axis of between 30 and 360 degrees along said length; and
- a rotational support element proximate to a second end of said tube;
- a moveable support member for supporting said cutting tube for movement in the direction of the tube axis into the food product to be cut and for withdrawal of said cutting tube from the food product;
- said rotational support element supporting said cutting tube on said support member to permit rotation of said tube in a first direction as the tube is inserted into the food product and in an opposite direction as the tube is withdrawn from the food product to thereby cut a twisted strip of the food product.

15. The apparatus of claim 14 wherein said tube has a polygonal cross section.

16. The apparatus of claim 14 wherein said tube has a square cross section.

17. The apparatus of claim 16 wherein said square cross section has a dimension between 5 mm×5 mm and 30 mm×30 mm.

18. The apparatus of claim 16 wherein said tube comprises a square cross section of about 10 mm×10 mm in dimension having a length of about 20 cm, said square cross section being rotated about 360 degrees along the length of the tube.

19. Apparatus for cutting a food product comprising:
- a plurality of hollow tubes each having a first end and a second end, a longitudinal axis, and a non-circular cross section;
- said first end of each tube comprising a food cutting element;
- each said tube having a twist about its longitudinal axis of between 30 and 360 degrees along said length; and
- a ring secured to each said tube proximate to said second end thereof and centered about said longitudinal axis of said tube;
- wherein each said ring and tube comprises a cutting tool for cutting food into strips having a twisted shape;
- a first subset comprising plurality of said hollow tubes;
- a plate assembly comprising at lease a first plate and a second plate, the first plate having a plurality of apertures for receiving therein said respective plurality of food cutting tubes;
- a first plurality of concave receptacles located about at least a first subset of said plurality of apertures on a first face of said first plate, said concave receptacles dimensioned to receive therein a ring of a food cutting tube and supporting said tube for rotational movement about its longitudinal axis;
- the second plate having a plurality of apertures corresponding to said apertures of said first plate for receiving therein said respective plurality of food cutting tubes, a second plurality of concave receptacles located about a first subset of said corresponding plurality of apertures on a first face of said second plate, said concave receptacles of said second plate dimensioned to receive a ring of said food cutting tube and supporting said tube for rotational movement about its longitudinal axis;
- said first and second plates being secured to one another with said respective first surfaces facing each other and said apertures in the first and second plates in alignment so that said plurality of food cutting tubes pass through said apertures and the rings of at least said first subset of said plurality of food cutting tubes are supported by said first plurality of concave receptacles and said second plurality of concave receptacles for rotation therein about their longitudinal axes.

20. The apparatus of claim 19 further comprising:
- a second subset comprising a second plurality of said hollow tubes;
- a third plate having a plurality of apertures corresponding to apertures in said first and second plates for receiving therein said second plurality of food cutting tubes;
- a third plurality of concave receptacles located about at least a second subset of said plurality of apertures on a first face of said third plate, said concave receptacles dimensioned to receive a ring of one of said food cutting tubes;
- wherein said second plate further comprises a second surface opposite said first surface, a fourth plurality of concave receptacles located about at least said second subset of said plurality of apertures on said second surface and dimensioned for receiving therein said rings of said second subset of food cutting tubes;
- wherein said second and third plates are secured to one another with the first surface of the third plate and the second surface of the second plate facing each other so that said second plurality of food cutting tubes pass through said apertures and the rings of at least said second subset of said food cutting tubes are supported by said third plurality of concave receptacles and said fourth plurality of concave receptacles for rotation about their longitudinal axes.

21. The apparatus of claim 19 wherein said tubes have a rectangular cross section.

* * * * *